INVENTOR.
STANLEY A. LUNDEEN
BY
Moore, White & Burd
ATTORNEYS

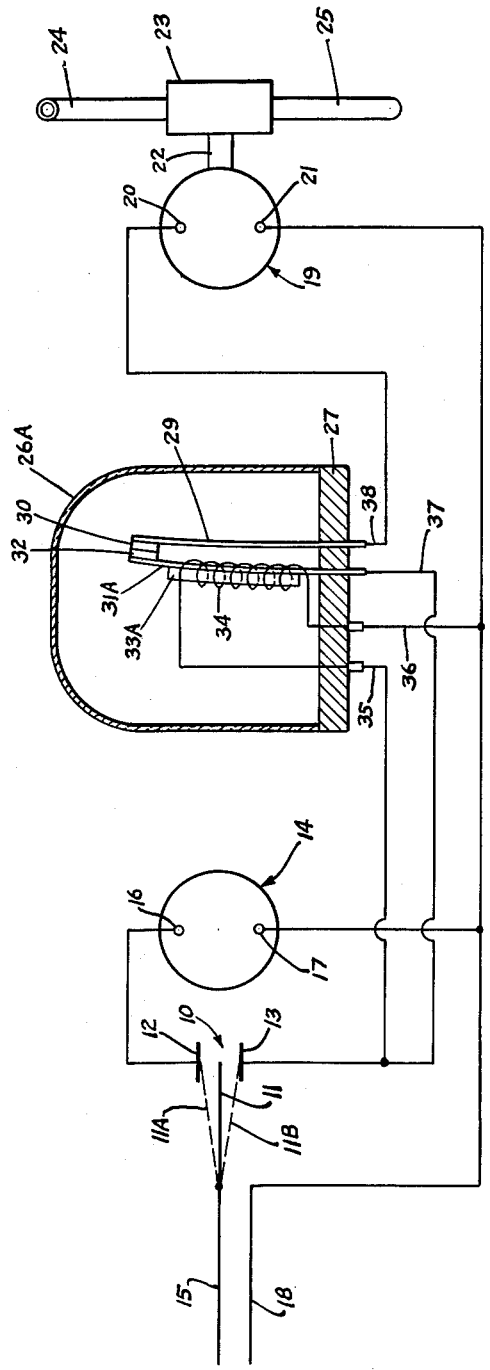

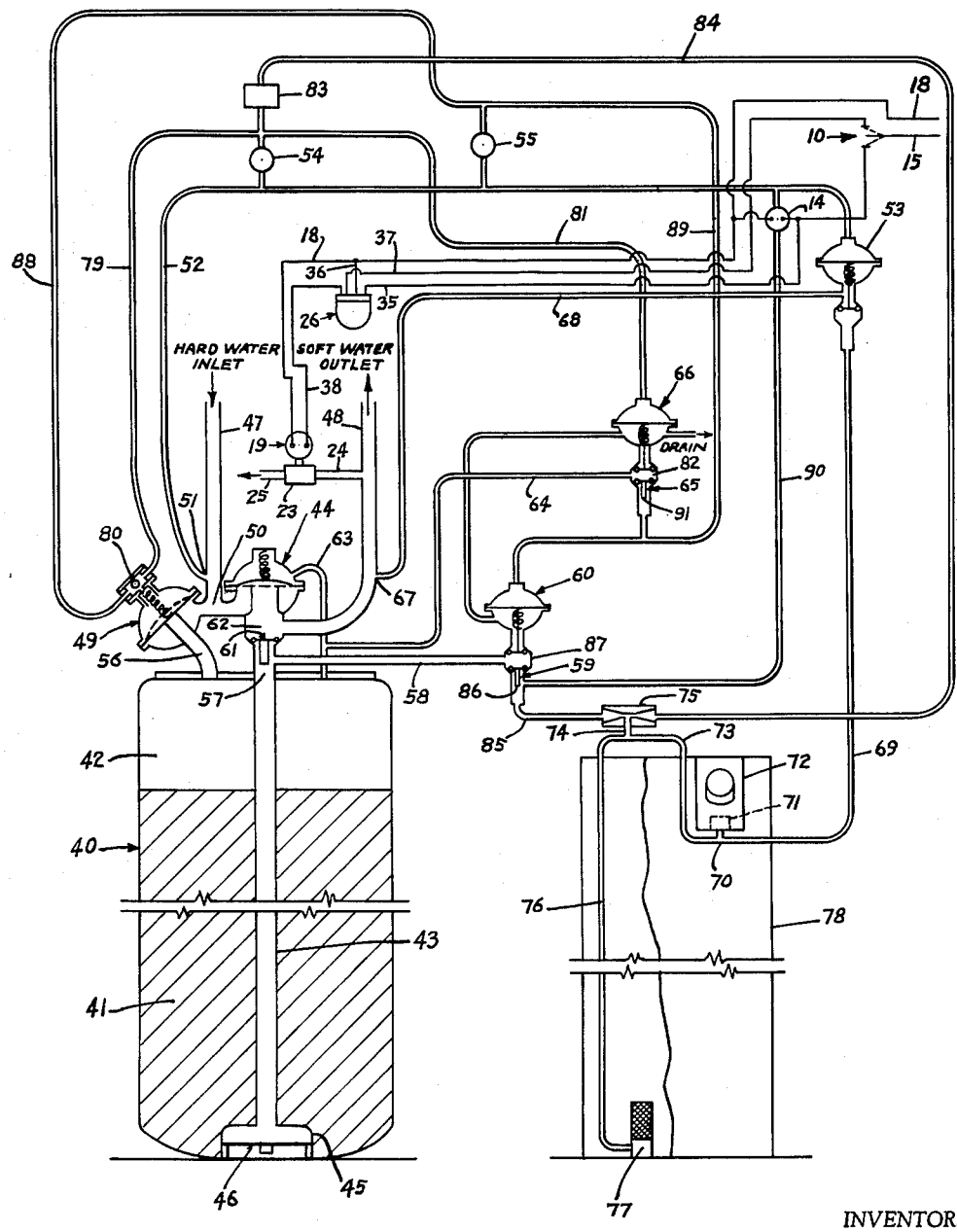

United States Patent Office 3,256,990
Patented June 21, 1966

3,256,990
WATER SOFTENER FLUSHING SYSTEM
Stanley A. Lundeen, 2946 Stinson Blvd.,
Minneapolis 18, Minn.
Filed Oct. 20, 1960, Ser. No. 63,811
5 Claims. (Cl. 210—138)

This invention relates to a system for flushing from a water softening system the small amount of hard water remaining in the water softener after completion of the regeneration cycle. More particularly this invention relates to auxiliary means for use in connection with any electrically-operated, clock-controlled, solenoid-valved water softening system for the purpose of flushing to a drain or sewer a sufficient amount of soft water to remove from the mineral containing water softening tank any hard water remaining after completion of the regeneration cycle along with any dirt, iron particles, turbidity and the like remaining as the result of the introduction of hard water into the water softening tank during regeneration.

Water softening systems presently in widespread use operate upon an ion exchange principle. It is well known that the so-called "hardness" in water is due principally to dissolved calcium and magnesium salts. It is also well known to "soften" hard water by passing it through a bed of ion exchange material so that in the course of its passage through the ion exchange material the calcium and/or magnesium ions are replaced by sodium ions from the exchange material.

The capacity of ion exchange material to replace calcium and magnesium ions with sodium ions is, of course, not unlimited. After exhaustion the ion exchange materials may, however, be revitalized or regenerated for reuse by passing a solution containing sodium ions, usually a brine solution, through the bed of ion exchange material, and the reverse reaction takes place wherein sodium replaces calcium and magnesium in the ion exchange material and the calcium and magnesium ions are flushed from the system as chlorides.

For any given water softener installation, the capacity of the bed of ion exchange material is known and the average hardness of the water used at that installation is also known. Means are known and available for initiating regeneration of the bed of ion exchange material in the water softener, at a frequency based either upon use of soft water or upon passage of predetermined periods of time, before complete exhaustion of the ion exchange material in order to insure a constant supply of soft water to the user of the system. Regeneration is usually scheduled to take place at an hour of low water consumption, such as in the early morning hours. The reason for this is that during regeneration the brine regenerating solution is forced through the system by hard water under the pressure of the hard water supply main. Thus, if the faucets connected to the soft water distribution system are turned on during the period of regeneration they will draw hard water and/or brine.

The passage of brine through the water softening system to a drain or sewer is followed by a flow of fresh hard water to force the brine out of the system and rinse the water softening mineral. In the more advanced water softening systems this rinsing flow of fresh hard water is followed by a backwash flow of fresh hard water in the opposite direction. In spite of these precautions, in areas in which the hard water is contaminated by a high iron content, or is turbid, or contains other sediment or silt, this material tends to be filtered out of the hard water used in the regeneration cycle and at the completion of the regeneration cycle tends to settle to the bottom of the water softening mineral tank. Then when soft water is first drawn from the soft water distribution lines of the system after regeneration there is a tendency to receive a slug of discolored or dirty or turbid water which is displeasing to the housewife and other household consumers of the soft water.

It is the principal object of this invention to provide means by which that portion of hard water used in regeneration which remains in the water softening system after completion of the regeneration cycle is flushed out of the system with soft water and discharged to a drain or sewer automatically at the end of the regeneration cycle, before it can be drawn by the consumer at one of the faucets connected to the soft water distribution system. This is accomplished by providing an auxilary flow line between the soft water distribution system and a suitable drain which is controlled by a solenoid operated valve automatically actuated to open to permit flow of water immediately after completion of the regeneration cycle and located as close to the water softening mineral tank as possible.

Even in those areas where iron or silt or other turbidity is not a problem the trace of salt which may remain in the water softening mineral tank and be discharged with the initial flow of soft water after regeneration is objectionable to some people. This might be noticed, for example, where a consumer immediately after arising on the morning after regeneration of the water softening mineral draws a glass of water for drinking. One with a sensitive palate might in this instance detect an objectionable salty flavor in the water. The flushing system of the present invention is also directed to alleviation of this condition.

Exemplary of automatic electrically-operated, clock-controlled, solenoid-valved domestic water softening systems are those described in my Patent No. 2,902,155 issued on September 1, 1959, and that described and illustrated in my co-pending applications Serial No. 693,481, filed October 30, 1957 (now Patent No. 3,055,994, issued September 25, 1962) and Serial No. 716,151, filed February 19, 1958 (now Patent No. 3,066,801, issued December 4, 1962). In the first of these systems, a one phase regeneration cycle is controlled by a clock which at predetermined intervals mechanically controls energization and deenergization of a solenoid actuated valve. The more advanced system described in my co-pending applications permits a regeneration cycle of several phases including a backwash phase at the end of the regeneration cycle. Regeneration of this system is also initiated by mechanical action of a clock to energize and de-energize solenoid valves which control water flows within the system. The auxiliary flushing system of the present invention is adapted for use with either of these water softening systems of my previous patent and applications or with any other automatic domestic water softening system in which water flows are controlled by solenoid actuated valves which act in response to a clock.

The invention is illustrated in the drawings in which the same numerals refer to corresponding parts and in which:

FIGURE 2 shows a modified form of flushing system; and

FIGURE 3 is a schematic representation of the form of flushing system according to FIGURE 1 shown in conjunction with other elements of an exemplary automatic water softening system operatively connected to control a three phase regeneration cycle.

Figure 1:
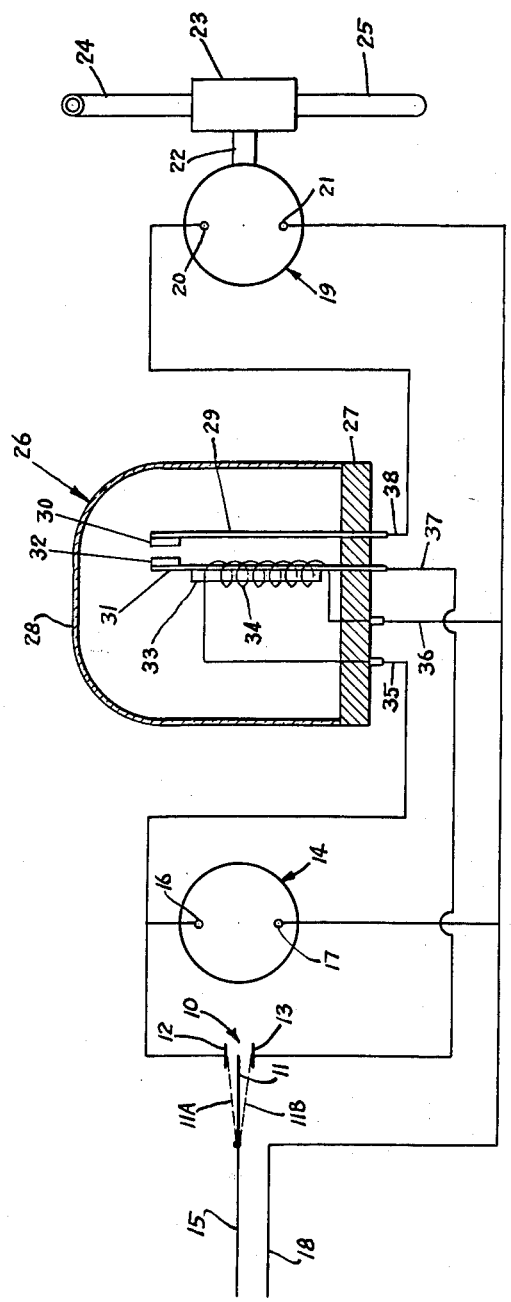
FIGURE 1 shows diagrammatically one form of the flushing system of the present invention in association with elements held in common by all automatic electrically-operated clock-controlled solenoid-valved domestic water softening systems.

Referring to FIGURE 1, there is shown schematically a switch, indicated generally at 10, which is an existing component in modern automatic domestic water softeners with which the present invention is adapted to be employed. The switch 10 is of the type in which the actuated mechanism 11 is a bent arm or diaphragm which makes or breaks contact by a minute motion by snapping from one position (indicated in broken lines at 11A in which it is in contact with a contact member 12) to a second position (indicated in broken lines at 11B in which it is in contact wtih a second contact member 13). The actuated mechanism 11 snaps in response to mechanical action of a control clock (such as clock 72, FIGURE 3) governing operation of the water softening system. The control clock acts in most cases through cams or fingers or lugs on the rotating face of the clock which press upon the switch actuating mechanism to snap the contact arm 11 rapidly and positively. Exemplary of such switch means are those sold under the trade name "Microswitch."

A solenoid 14 which actuates a valve in a flow line of the water softening system is also an existing component of the water softening systems with which the flushing system of the present invention is adapted to be used. Solenoid 14 is actuated through switch 10. Current flow is through lead-in wire 15 connected to a source of electrical power, to arm 11 in position 11A, to switch contact 12 and solenoid contact 16, with a return path from solenoid contact 17 to the other lead-in wire 18.

There is now provided another solenoid 19, having contacts 20 and 21 for connection to the electrical power source, whose plunger 22 is connected to actuate a valve 23 interposed in a flow line 24–25. The flow line is a piece of pipe or tubing. Flow line segment 24 is connected through any suitable joint or fitting so as to be in direct communication with the soft water distribution portion of the water softening system and desirably as close to the outlet from the water softening mineral tank as possible. The flow line segment 25 is disposed so as to discharge into any convenient drain or sewer. Valve 23 is normally closed except for a brief interval immediately following regeneration of the mineral contained in the water softening tank.

Contact 21 of solenoid 19 is connected to lead-in wire 18 and contact 20 is connected to lead-in wire 15 through switch 10 and a thermo "normally open" time delay relay, indicated generally at 26, for energization of the solenoid and opening of valve 23. The time delay relay mechanism shown diagrammatically in the drawing is of the vacuum tube type including a base 27 and a glass envelope 28 enclosing an evacuated space in which the operating elements are housed. This is an advantage in a water softening system in that the operating elements are protected against moisture, changing humidity conditions, corrosion and the like, but is not imperative to the flushing system of the present invention. Obviously other time delay devices not protected by an evacuated housing may be used.

The time delay relay includes an arm 29 extending from the base and carrying a contact element 30 at its free extremity and a second flexible arm 31 extending from the base and carrying a contact element 32 at its free extremity. The arm 31 includes a bimetallic element 33 which upon heating causes bending of the arm 31 so as to bring contact elements 32 and 30 into contact with each other and to close the circuit through the relay between switch 10 and solenoid 19. A heating coil 34 surrounds the bimetallic element to raise its temperature to operate the relay. The lead 35 of heating coil 34 is connected to power lead-in conductor 15 through the contact plate 12 of switch 10. The lead 36 of the heating coil is connected to the lead-in wire 18. The lead 37 of arm 31 is connected to the lead-in conductor 15 through contact plate 13 of switch 10. The lead 38 of contact arm 29 is connected to contact 20 of solenoid 19.

Switch 10, although a double throw switch, in its normal use in an automatic water softening system is used as an "on-off" switch, that is, the contact arm 11 when in "on" position 11A is in contact with contact plate 12 which in turn is connected to solenoid 14 but in the "off" position 11B is in contact with contact plate 13 whose terminal is normally not used. This unused terminal of contact plate 13 is now utilized to permit switch 10 to control flow of current through the time delay relay to solenoid 19. Solenoid 14 is that solenoid which controls the last phase of the regeneration cycle of the water softening system and switch 10 is that switch which controls energizing and de-energizing of the solenoid. In most automatic water softening systems but one switch and one solenoid are present and regeneration occurs in a single phase cycle. In more sophisticated water softening systems, wherein the regeneration cycle includes two or three or more phases, solenoid 14 is that solenoid which is energized during the last phase of the regeneration cycle and switch 10 is the switch which controls that solenoid.

When switch 10 is in "on" position 11A during the last phase of the regeneration cycle solenoid 14 is energized. At the same time heating coil 34 is energized to generate heat in the coil to heat the bimetallic element 33 so as to operate contact arm 31 to close the relay circuit by bringing contacts 32 and 30 together. Thus, it will be seen that the time delay relay is in operation during the last phase of the regeneration cycle and the circuit through the time delay relay is closed at this time. No current flows through the contact arms 29 and 31, however, because lead 37 of arm 31 is connected to the open side of switch 10 at contact plate 13. Accordingly, during the last phase of the regeneration cycle valve 23 which is controlled by solenoid 19 remains closed.

At the end of the regeneration cycle switch 10 is mechanically actuated by the control clock of the water softening system to its normal "off" position 11B in which arm 11 contacts the contact plate 13. However, now switch 10 is a two way switch and current is permitted to flow from lead-in wire 15 to contact arm 31 of the time delay relay. Although mechanical actuation of switch 10 to its normal "off" position de-energizes solenoid 14 and heating coil 34, the contact elements 30 and 32 remain together for a predetermined period of time after application of heat to the bimetallic element ceases. Contacts 30 and 32 remain together so that current is permitted to flow through the time delay relay to solenoid 19 with a return path to lead-in 18.

Solenoid 19 is thus energized immediately after the end of the regeneration cycle and valve 23 in the flow line 24–25 is opened. Water is then permitted to flow from the soft water distribution side of the water softening system out through flow line 24–25 and valve 23 to be discharged. The first two or three gallons of this discharge is principally the hard water remaining in the water softening mineral tank as a consequence of regeneration with fresh hard water. This hard water and the subsequent softened rinse water flushes from the water softening tank the accumulated rust or silt or other sediment or other materials contributing to turbidity of the water, as well as any traces of brine left in the water softening tank. This discharge flow occurs so long as contact elements 30 and 32 remain together as a result of the bending of arm 31 by the heated bimetallic element.

Since the bimetallic element is no longer subjected to a source of heat after completion of the regeneration cycle that element gradually cools and the contact elements separate to break the circuit between the solenoid 19 and the electrical power source. As soon as solenoid 19 is de-energized valve 23 is closed and the discharge flow ceases. The flushing system then remains inactive until the last phase of the next regeneration cycle when the heating coil 34 is again energized preparatory to energization of solenoid 19.

Time delay relays are commercially available to operate with predetermined delay intervals such as 30 seconds, 60 seconds, 90 seconds and the like, within a margin of error of a few seconds. Thus, the contact elements 30 and 32 come together a predetermined period of time after application of current to the heating coil and the contacts separate a similar predetermined period of time after application of current to the heating coil is stopped. The discharge flow from the water softening tank is determined by the rate of flow of the solenoid actuated valve 23 and the time delay interval of the relay. For example, a solenoid valve may be selected having a delivery rate of three gallons per minute under existing pressure conditions and a time delay relay tube may be selected having a 90 second interval. In this instance the discharge flow would amount to 4½ gallons during the interval of the flushing operation. Since this is more than twice the usual volume of water contained in the water softening tank of the water softening system it is ample to discharge the initial slug of water following regeneration, which, because of turbidity or other contamination, might be objectionable. Where greater or lesser discharge flows are desired time delay relay devices of appropriate interval and solenoid actuated valves of apporpriate delivery rate may be selected.

It will be noted that the heating coil is energized only during the last phase of the regeneration cycle. Even though the water softening system in which the flushing system according to the present invention is utilized is one in which the regeneration cycle has but one phase the heating element is on for but a relatively short time and consumes a minimum amount of current. Where the regeneration cycle includes several phases the heating element is on only during the last phase with the result that even a smaller amount of current is used.

It will also be noted that the "normally open" time delay relay described in connection with FIGURE 1 is utilized according to the present invention opposite from the intended manner of use. Normally such devices are used to pass a current after a predetermined period of time. In the present system the relay device is utilized to pass a current only for that predetermined period after current to the heating element of the relay is shut off, until normal cooling of the bimetallic element causes the contact members to snap apart.

Referring now to FIGURE 2 of the drawings, there is shown a slightly modified system utilizing a "normally closed" time delay relay. The switch indicated schematically at 10 is an existing component in modern automatic domestic water softeners, as previously described. This switch, although a double throw switch, in its normal use in an automatic water softening system, is used as an "on-off" switch, as described. This switch may be either the switch which controls the entire regeneration cycle or it may be the switch which controls the last phase of the regeneration cycle in more sophisticated softening systems. The contact arms 11, when in "on" position 11A, is in contact with contact plate 12 to close the circuit which controls the regeneration cycle, or at least the circuit which controls the last phase of that cycle. In normal use, the contact arm 11, when in the "off" position 11B is in contact with contact plate 13 whose terminal is not used. This unused terminal of contact plate 13 is now utilized to permit switch 10 to control flow of current through the heating element 34 of "normally closed" time delay relay 26A.

The "normally closed" time delay relay is in most respects similar to the "normally open" time delay relay already described. The exception is that, in the instance of the "normally closed" time delay relay, the second flexible arm 31A carrying a contact element 32 on its free extremity and including a bimetallic element 33A, upon heating is caused to be bent so as to separate the contact elements 32 and 30 to open the circuit through the relay. The lead 35 of heating coil 34, which surrounds the bimetallic elements 33A is connected to power lead-in conductor 15 through the contact plate 13 of switch 10. The lead 36 of the heating coil is connected to the other lead-in wire 18. The lead 37 of arm 31A is also connected through contact plate 13 of switch 10 to the lead-in conductor 15. The lead 38 of contact arm 29 is connected to contact 20 of solenoid 19. Contact 21 of solenoid 19 is connected to lead-in wire 18.

In the operation of the flushing system utilizing a "normally closed" time delay relay, the heating element 34 is energized all of the time except during the periods during which the water softening system is undergoing regeneration, or at least the last phase of the regeneration cycle. Although this means that the heating element consumes power almost continuously, this power consumption is extremely low and the heat generated assists in minimizing high humidity conditions in the vicinity of the control mechanisms of the water softening system. Thus, between regeneration cycles, when the switch 10 is in its normal "off" position 11B in which arm 11 contacts the contact plate 13, because this normally unused contact plate is now utilized, current is permitted to flow from lead-in wire 15 through the switch to the heating element 34 and back to the lead-in wire 18.

During all of this time during which the heating element is energized, the bimetallic element 33A bends the contact arm 31A so as to maintain the contacts 32 and 30 separated and to maintain the circuit to solenoid 19 open. Thus, even though the contact arm 31A is connected to lead-in wire 15 through the closed switch, and contact 21 of solenoid 19 is connected directly to lead-in wire 18, the solenoid is not energized because the circuit is maintained open because of the separation of the contacts 30 and 32 under influence of the heated bimetallic element.

At the beginning of the regeneration cycle (or the beginning of the last cycle thereof) switch 10 is mechanically actuated by the control clock of the water softening system to its normal "on" position 11A, in which arm 11 contacts the contact plate 12, to energize the regeneration circuit or that portion of it which controls the last phase of the regeneration cycle. When the contact arm of the switch changes position, the circuit to the heating element 34 of the "normally closed" time delay relay opened and the heater is de-energized. As the bimetallic element 33A cools, the contact arm 31A bends to bring the contacts 30 and 32 together to close the circuit energizing the solenoid 19. However, because that circuit passes through switch 10, which is now open between contact arm 11 and contact plate 13, no current flows to energize the solenoid.

Upon completion of the regeneration cycle, the switch 10 is mechanically actuated to open the regeneration circuit. The switch arm 11 is moved into contact with terminal plate 13 and once again current flows to energize the heating element 34 of the "normally closed" time delay relay 26A. At the same time current flows from lead-in wire 15 through switch arm 11 and terminal plate 13 to lead 37 of contact arm 31A. Contact arm 31A is in its "normally closed" position in which contacts 32 and 30 are together so that current flows through these contacts to contact arm 29 and lead 38 to contact 20 of solenoid 19, whose other contact 21 is directly connected to lead-in wire 18. Thus, the solenoid 19 is energized to actuate valve 23 to permit the flow of a flushing stream of water.

Solenoid 19 is energized in this manner only for that predetermined period of time that is required to heat the bimetallic element 33A sufficiently for it to bend contact arm 31A to separate the contacts 32 and 30 to open the circuit. As previously described, time delay relays are commercially available to operate with predetermined delay intervals. After the contacts are separated under influence of the heating element, the solenoid 19 remains de-energized until the end of the next regeneration cycle because of the continuous energization of the heating element.

It will be noted that the "normally closed" time delay relay described in connection with FIGURE 2 is also utilized according to the present invention opposite from the intended manner of use. The device is not used to pass current after a predetermined period of time, but instead is utilized to pass current only from a predetermined short period after current to the heating element of the relay is applied, until heating of the bimetallic element causes the contact members to separate.

Referring now to FIGURE 3 of the drawings, the flushing system in the form according to FIGURE 1 is shown schematically in combination with one exemplary form of water softening system which is fully described in my aforesaid copending application Serial No. 716,151, which is now Patent No. 3,066,801. That system includes an elongated and upright tank 40 adapted to contain a supply or bed 41 of a water softening ion exchange material, such as zeolite, to a level at about one-half to three-fourths of the tank's volumetric capacity to leave a freeboard area 42 at the top of the tank. Tank 40 is preferably provided with a rounded bottom.

The tank 40 is provided with a central tubular conduit 43 whose upper end is fitted into a projecting collar or boss at the bottom of a control valve means 44 mounted on the top of tank 40. The lower end of tube 43 terminates in a bell 45 supported by feet just off the surface of the bottom of the tank 40. A fine screen 46 stretched across the bottom of the inverted bell 45 prevents the ion exchange material in the tank from being drawn into the central vertical tube.

The control valve means 44 is connected into a water distribution system with a hard water inlet 47 connected to a source of hard water and with a soft water outlet 48 to a soft water distribution system. Flowline 24 communicates with soft water outlet 48 as close to the control valve as possible. During the softening cycle, the pressures upon diaphragms in the diaphragm control valve 44 and diaphragm valve 49 are such that the diaphragms assume the positions shown in broken lines in FIGURE 3. Diaphragm valve 49 is open and diaphragm valve 44 is closed. During the softening cycle, hard water enters through inlet 47 to chamber 50. Flow through diaphragm valve 44 is prevented because the greater pressure on the top of the diaphragm in that valve maintains the valve closed.

Port 51 is permanently open so that the pressure of the hard water supply is maintained in line 52 to maintain pressure upon the top of the resilient diaphragm in a metering valve 53. The metering valve per se is the subject of my copending application Serial No. 676,777, which is now Patent No. 3,048,274. Any flow of water from line 52 is prevented by solenoid actuated valves 54, 55 and 14 which remain closed during the water softening cycle. Because the pressure exerted by the hard water supply main on the lower side of the diaphragm in diaphragm valve 49 is greater than the pressure on the upper side of the diaphragm, that valve remains open. Hard water may thus flow through valve 49 to chamber 56 into the top of the water softening tank 40.

The hard water is forced down through the bed of mineral 41 in the tank 40 and, in the course of its passage, becomes softened by ion exchange, as is well understood in the art. The resulting soft water enters the inverted bell at the bottom of the tank and is forced upwardly through tube 43 to the chamber 57 at the bottom of the control valve 44. Outward flow from chamber 57 through channel 58 is prevented by virtue of check valve 59 and the fact that diaphragm valve 60 is maintained closed by spring pressure and by the water pressure of the tank against the plunger to hold it closed.

The soft water being under pressure, may, however, lift check valve 61 and enter chamber 62. No soft water may flow through diaphragm valve 44 because that valve is closed. It is closed by virtue of the superior pressure applied from the top of the water softening tank through channel 63 to the tap of diaphragm valve by spring pressure. No hard water may escape through channel 64 which is connected to channel 63 because of check valve 65 and the fact that diaphragm valve 66 is maintained closed by spring pressure and by the water pressure of the tank against the plunger.

Upon the opening of any tap or faucet connected in the soft water distribution system, soft water may flow out through the soft water outlet 48. At the same time, soft water is permitted to flow through port 67 through a line 68 to metering valve 53 in a predetermined fixed proportion to the amount of soft water drawn through the soft water outlet, in the manner described in detail in my aforesaid copending application Serial No. 676,777 and Patent No. 3,048,274.

The soft water metered out by the metering valve 53 flows under pressure through a line 69 through a T-fitting 70 which is connected to a vacuum dash-pot 71 of a clock control unit 72 of the type described in my copending United States application Serial No. 693,481, which is now Patent No. 3,055,994, and thence through a line 73 to a T-fitting 74 (which in turn is connected to the throat of a venturi tube 75) and thence through tubing 76 to a salt strainer device 77 at the bottom of a brine generating tank 78 where it contacts stored salt to generate a brine solution for use in reconditioning of the mineral water softening bed.

The construction of the salt strainer device 77 is described in detail in my copending application Serial No. 743,066, now Patent No. 2,972,412, and a preferred form of brine generating vessel is described in my copending application Serial No. 709,055, now Patent No. 2,985,514.

Thus, in the operation of the water softening system to soften water, soft water is withdrawn from the distribution system for use as needed and this is furnished by passage of hard water through the system and out in the manner described. Simultaneously, with the normal consumption of soft water, a predetermined fixed small proportion of soft water is by-passed to the brine generating vessel for preparation of a brine solution for use in revitalizing the mineral bed when necessary.

Regeneration may be carried out automatically when determined to be necessary according to the volume of soft water consumed, as reflected by the level of brine present in the brine generating vessel, as described in detail in my aforesaid Patent No. 3,055,994. Alternatively, in some installations, as for example, where soft water consumption is fairly uniform, regeneration may be carried out automatically at predetermined fixed intervals such as every day, or every other day, or every third day or the like. In any event, regeneration is carried out during the period of minimum soft water consumption such as in the extreme early morning hours as, for example, 3:00 a.m.

The regeneration cycle is initiated by action of the control clock 72 mechanically actuating a switch to energize the solenoid controlled valve 54. When this happens, the pressure of the hard water supply main is exerted through the hard water inlet 47 upon chamber 50 and through port 51 and line 52 upon the valve 54. Since this valve is now open, the water at main pressure is permitted to flow through the valve 54 for distribution as follows.

When valve 54 is opened, the pressure of the hard water supply line is exerted through line 79 upon one side of a two-way ball check valve element 80 and upon the upper side of the resilient diaphragm of the diaphragm valve 49. This pressure, plus auxiliary spring pressure, forces the diaphragms against the valve seat in the solid line position shown in FIGURE 3 to close valve 49. Pressure upon the ball 80 prevents outward flow from the opposite side of the channel of the two-way check valve.

When valve 54 is opened the pressure of the hard water supply line is also exerted through line 81 upon the upper pressure chamber and diaphragm of diaphragm drain valve 66. The main pressure in the upper pressure chamber of diaphragm valve 66 is sufficient to overcome the pressure of the coil spring in that diaphragm valve and open that valve to chamber 82 so that water may then flow from chamber 82 and out through one of the ports below the diaphragm to a drain or sewer. A constant flow control device 83 is inserted between the valve 54 and line 84 to venturi tube 75 (or, more precisely, between lines 79 and 81 and line 84, as shown in FIGURE 3) in order to reduce the volume of the stream of water permitted to flow to the venturi tube.

Thus, with the first phase of the regeneration cycle initiated and solenoid controlled valve 54 open, the pressure of the hard water supply main is applied against the diaphragm of diaphragm valve 49 to maintain that valve closed with the assistance of spring pressure. Hard water from chamber 50 is prevented from flowing to the top of the water softening tank relieving the top of the water softening tank from the supply main pressure and also thereby relieving the top of the diaphragm of diaphragm valve 44 from that pressure.

Accordingly, if any of the soft water taps are opened during the period of regeneration, hard water may now flow from the chamber 50 through the open diaphragm valve 44 to the chamber 62. Check valve 61 prevents flow of hard water into chamber 57 and tube 43. The hard water may, however, flow out through the soft water outlet 48 and in this manner hard water is by-passed during the regeneration cycle. If any water is drawn from the soft water taps during regeneration, a predetermined small amount of this water will flow through port 67 to be metered by metering valve 53 into the brine generating vessel. This flow, however, will be negligible since normally no water will be drawn from the water distribution system during the regeneration cycle.

After initiation of the regeneration cycle the water flow released by opening of valve 54 maintains pressure upon the diaphragms of diaphragm valve 49 and diaphragm valve 66 in the manner described. The reduced flow through the flow control device 83 and line 84 to the venturi tube 75 passes through a line 85 and through port 86 lifting check valve 59 and passing through channel 58 to chamber 57. Diaphragm drain valve 60 remains closed during this first phase of the regeneration cycle. As the water from line 84 flows through the restricted throat of the venturi tube 75 it creates a reduced pressure within the throat which draws the brine from the bottom of the tank 78 through the salt strainer unit 77, and up through the tubing 76 and through the venturi tube for passage through line 85, and past check valve 59 into chamber 87 and channel 58 to chamber 57 at the bottom of the control valve means 44 and at the top of tube 43 in the water softening tank.

Chamber 62 in the control valve means is at the pressure of the hard water supply main. This insures that check valve 61 remains in place. The brine solution is thus forced down through tubing 43 to the bottom of the bed 41 of mineral water softening material and is distributed on the bottom of the tank and forced upwardly through the mineral bed in ion exchanging relationship. The brine solution rises through the mineral bed to the freeboard 42 of the tank pushing the fresh water in the freeboard of the tank ahead of it and out through channel 64 to chamber 82. Since the pressure upon the diaphragm in diaphragm drain valve 66 now holds that valve open, the water forced from the water softening tank passes through the drain valve 66 to a drain or sewer. Flow from chamber 82 is otherwise prevented by check valve 65.

After all of the brine in the brine generating tank has been withdrawn through the tube 76, the float valving element seats in the resilient valve seat of the salt strainer unit 77 and creates a suction within tubing 76, which in turn transmits itself through line 73 and fitting 70 to the vacuum dash-pot 71 on the control clock 72. The vacuum exerted upon the dash-pot 71 of the control clock introduces a time delay of sufficient length to permit substantially all of the brine solution to pass through the mineral bed to the freeboard of the tank 40.

At the expiration of this delay period the clock control actuates microswitches which de-energize the solenoid controlling valve 54 and energize the solenoid controlling valve 55. When this occurs, pressure is relieved upon diaphragm drain valve 66 causing that valve to close. At the same time pressure is relieved upon one side of the two-way ball check valving element 80 and would relieve pressure upon the diaphragm in diaphragm valve 49 except that, with solenoid controlled valve 55 now open, the pressure of the hard water supply line is asserted through valve 55 and line 88 upon the opposite side of the ball 80 to maintain the pressure upon diaphragm valve 49. The pressure of the hard water supply main is also exerted through valve 55 and line 89 on the top of the diaphragm valve 60. At the same time, water from line 89 passes under pressure through port 91, lifting check valve 65, and passes through channel 64 into the top of the water softening tank 40.

This inflow of fresh water to the top of the water softening tank forces the brine left in the freeboard of the tank back down through the mineral bed in the opposite direction and up through the central tube 43 so that the brine solution passes through the mineral bed twice, once in each direction. This dual upflow and downflow contact of the brine with the mineral water softening material thus provides double the contact time between the brine and mineral facilitating and insuring complete revitalization of the mineral.

The brine solution forced upward through the central tube 43 into chamber 57 passes through channel 58 to chamber 87. Outflow from chamber 87 through port 86 is prevented by check valve 59. However, since diaphragm drain valve 60 is now pressurized, that drain valve is open and the brine solution passes through that valve, and through the lower bowl of drain valve 66, to the drain or sewer. The flow of fresh water through solenoid actuated valve 55 is continued for a time period, predetermined by the setting of the control clock, sufficient to insure removal of all of the brine from the mineral bed and to thoroughly rinse the mineral with fresh hard water.

At the end of this second phase of the regeneration cycle the clock control actuates microswitches to de-energize the solenoid controlling valve 55 and to energize the solenoids controlling valves 54 and 14. When this occurs, diaphragm drain valve 60 is again closed, diaphragm drain valve 66 is again opened and diaphragm valve 49 remains pressurized, but from line 79 instead of line 88 because of the shift in position of the two-way ball check 80. Fresh hard water is injected from valve 54 into port 86 and through tube 43 to the bottom of the mineral bed in the manner heretofore described for the introduction of the brine, but because of the relatively low volume of this flow it is supplemented by a further flow through valve 14 and line 90 to port 86. This larger volume supplemental flow flushes and rinses the bed in its upflow passage with hard water to remove any traces of brine or other contaminate which may remain after the previous downflow rinsing.

Solenoid 14 controls the last phase of the regeneration cycle. Accordingly, when this solenoid is energized, the heating coil 34 of the time delay relay 26 is energized at the same time to generate heat in the coil to heat the bimetallic element so as to operate the contact arm to close the relay circuit. The time delay relay is in operation during the last phase of the regeneration cycle.

This third phase of the regeneration cycle is allowed to continue for a time sufficient to insure complete washing of the mineral bed with hard water. At the end of this period the control device de-energizes all of the solenoids, so that valves 54 and 14 are then closed and the system is returned to its normal water softening function. This means that diaphragm valve 49 is depressurized, diaphragm valve 44 is pressurized and diaphragm valves 66 and 60 are both depressurized but maintained closed by spring action.

With the system returned to its normal condition it is ready for initiation of the next water softening cycle with the exception of the brief flushing of the system with soft water to replace any hard water remaining in the system downstream from the mineral bed. This flushing occurs as the result of the opening of solenoid controlled valve 23 by the time delay relay. During this soft water flushing cycle, after the end of the regeneration cycle, the water softening system goes through its normal water softening flow with the exception that the soft water discharge from the top of the mineral tank flows through lines 24 and 25 to a drain or sewer instead of through one of the taps or faucets of the normal soft water distribution system.

It is apparent that many modifications and variations of this invention as hereinbefore set forth may be made without departing from the spirit and scope thereof. The specific embodiments described are given by way of example only and the invention is limited only by the terms of the appended claims.

I claim:

1. In an automatic electronically-operated, clock-controlled, solenoid-valved water softening system including a mineral containing water softening tank, means for regenerating the mineral in said tank, a soft water distribution line in communication with said tank, a clock-actuated double throw switch controlling the last phase of the regeneration cycle of said system, a flushing system for removing from the water softening tank the hard water remaining therein after regeneration, said flushing system including a flow line from the soft water distribution line of said water softening system, a solenoid-actuated valve in said flow line, a solenoid operatively connected to actuate said valve, a thermally actuated time delay relay unit having a pair of spaced contact arms, a heat sensitive bimetallic element associated with one of said arms and means for heating said bimetallic element, electrical circuit means connecting said solenoid to a source of electrical current through one terminal of said clock-actuated double throw switch of said water softening system controlling the last phase of the regeneration cycle thereof and through said thermally actuated time delay relay unit, said circuit connecting one of said arms of said time delay relay to said solenoid, further electrical circuit means connecting said heating means to a source of electrical current, said further circuit passing through one terminal of said clock-actuated switch, whereby said solenoid actuating said valve is energized through said time delay relay to open said valve after completion of the regeneration cycle of said water softening system.

2. A system according to claim 1 further characterized in that said solenoid-actuated valve is positioned closely adjacent to the outlet of said water softening tank.

3. A system according to claim 1 further characterized in that said time delay unit is a time delay relay vacuum tube.

4. A system according to claim 1 further characterized in that the means for heating the bimetallic element of the time delay unit is a heating coil encircling said bimetallic element.

5. A system according to claim 1 further characterized in that one end of said flow line is in communication with a drain for discharge therein.

References Cited by the Examiner

UNITED STATES PATENTS

| | | | |
|---|---|---|---|
| 1,952,299 | 3/1934 | Van Valkenburg | 317—141 X |
| 2,012,194 | 8/1935 | Hughes | 210—140 X |
| 2,254,782 | 9/1941 | Riche | 210—96 X |
| 2,265,225 | 12/1941 | Clark | 210—140 X |
| 2,275,657 | 3/1942 | Wetzel | 158—124 |
| 2,295,340 | 9/1942 | Fiene | 200—122 |
| 2,423,316 | 7/1947 | Holmes | 317—141 |
| 2,454,659 | 11/1948 | Leonard | 200—122 X |
| 2,507,343 | 5/1950 | Lindsay et al. | 210—139 X |
| 2,738,072 | 3/1956 | Knight | 192—136 X |
| 2,913,554 | 11/1959 | Orechio | 200—122 |
| 2,939,933 | 6/1960 | Manganaro et al. | |
| 3,017,995 | 1/1962 | Kryser | 210—138 |

REUBEN FRIEDMAN, *Primary Examiner.*

GEORGE D. MITCHELL, HERBERT L. MARTIN, HARRY B. THORNTON, *Examiners.*